2,988,421
PROCESS FOR THE SEPARATION OF THORIUM AND RARE EARTHS FROM MONAZITE
William Palmer Kemp, Shenfield, and James Johnston, Hainault, England, assignors to Thorium Limited, London, England, a corporation of Great Britain
No Drawing. Filed Aug. 20, 1957, Ser. No. 679,126
Claim priority, application Great Britain Aug. 24, 1956
9 Claims. (Cl. 23—14.5)

This invention relates to a process for separating thorium and lanthanon salts from other materials present in monazite. The invention is particularly useful in that it provides a process for separating salts of thorium and the lanthanons from phosphate and impurities present in ground mineral monazite. The term lanthanon in this specification includes the elements with atomic numbers from 57–71; this group is also known as the rare earth elements.

Monazite sand is a mineral phosphate containing thorium and the lanthanon phosphates to the extent of about 95–98% by weight. Another source is ground mineral monazite which is far less pure than monazite sand and contains only about 75% of the thorium and lanthanon phosphates.

An approximate analysis of a typical sample of ground mineral monazite is as follows:

| | Percent |
|---|---|
| $ThO_2$ | 6 |
| Lanthanon oxide | 46 |
| CaO | 5 |
| $Fe_2O_3$ | 5 |
| $Al_2O_3$, etc. | 4 |
| CuO | 1.5 |
| PbO | 0.3 |
| $U_3O_8$ | 0.1 |
| $P_2O_5$ | 27 |
| $SiO_2$ | 5 |

In the process for obtaining thorium and the lanthanons from these materials the monazite in finely divided state is treated with sulphuric acid and extracted with water. Insoluble matter is filtered off and then by means of our invention the thorium and lanthanon compounds are separated from the impurities present in the extract.

This invention provides a process for the separation of thorium and lanthanon salts from impurities such as iron, calcium, copper and aluminium, phosphate present in monazite, in which process thorium and lanthanon double sulphate is precipitated from a filtered acidic extract of ground monazite in the presence of alkali metal and chloride ions.

The chloride ions may be most easily introduced in the form of hydrochloric acid or as an alkali metal chloride.

The alkali metal chlorides which it is preferred to use in the invention are those of sodium or potassium. For reasons of economy and efficiency it is preferable to use sodium chloride.

The separation of thorium from the lanthanons precipitated as the double salt is carried out in the normal way, that is to say, the double salt is converted with excess caustic soda to hydroxides from which on careful treatment with mineral acid can be obtained a solution containing the lanthanons which may be separated from the thorium hydroxide precipitate.

The acidity of the filtered acidic extract with which the alkali metal and chloride ions are mixed must be carefully controlled to obtain maximum precipitation of the double salt. Likewise, the concentration in the solution of the alkali metal and chloride ions must be carefully chosen to obtain the best results.

The solution should be acid and preferably should contain more than 200 gms. alkali metal and chloride ions per litre. The following tables show the loss of thorium and lanthanons under various conditions in the presence of sodium and potassium chloride.

| Acidity | NaCl, gm./l. | $ThO_2$ loss, gm./l. | $Ln_2O_3$ loss, gm./l. |
|---|---|---|---|
| 3 N | 200 | 1.22 | 0.8 |
| 3 N | 400 | 0.22 | 0.2 |
| 4.5 N | 200 | 0.65 | 0.4 |
| 4.5 N | 400 | 0.09 | 0.2 |
| 5.5 N | | 2.5 | |
| 5.5 N | 50 | 1.7 | |
| 5.5 N | 100 | 0.85 | |
| 5.5 N | 200 | 0.03 | 0.4 |
| 5.5 N | 400 | 0.02 | 0.4 |

| Acidity | KCl, gm./l. | $ThO_2$ loss, gm./l. | $Ln_2O_3$ loss, gm./l. |
|---|---|---|---|
| 5.5 N | 100 | 0.38 | 2.10 |
| 5.5 N | 200 | 0.008 | 1.11 |
| 5.5 N | 300 | 0.005 | 1.0 |

In a preferred form of the process the filtered extract has an acidity greater than 4.5 N. Further, more economic results are obtainable with a concentration of 200–400 gms. alkali metal and chloride ions per litre with the normal concentration of thorium and lanthanon being 50–60 gms./litre of solution expressed as oxide.

It has been found most satisfactory to add a portion of the filtered extract to the alkali metal chloride to form a slurry and then add to the slurry the remainder of the extract. The precipitation of the double sulphates should preferably take place at about 60° C. as below this temperature losses tend to increase; higher temperatures may be used but are not necessary. The double sulphate is then filtered off and washed carefully with an alkali metal chloride solution, care being taken to avoid unnecessary washing, so keeping losses at a minimum.

In its preferred form this process enables more than 99% of the thorium and lanthanon compounds to be precipitated from solution. A certain amount of phosphate remains with the thorium and lanthanon double sulphate but the amount is substantially less than that associated with the salts produced by earlier processes.

*Example 1*

200 lbs. ground mineral monazite (containing about 75% monazite) were mixed with 400 lbs. 96% sulphuric acid and stirred and heated to 200° C. This reaction mixture was allowed to stand overnight and then added to 130 gallons of water and stirred. The mixture was passed through a filter-press to remove insoluble material. A portion of the clear liquor, containing 51 gm./l. of $Ln_2O_3+ThO_2$ was added to 350 lbs. sodium chloride to form a thick slurry and then heated to 60° C. The remaining liquor was then added to the slurry slowly while heating sufficiently to keep the temperature at 60° C. After settling the clear mother liquor contained only 0.01 gm./l. of $ThO_2$ indicating over 99% of the thorium was precipitated. The solid was filtered on a rubber-lined spinner and washed on the spinner to remove undesirable impurities in the mother liquor. This washing is kept down to a minimum to avoid losses. A wash liquor containing 200 gm./l. NaCl and 50 gm./l. $Na_2SO_4$ is used. The double sulphate contains about 35% $Ln_2O_3+ThO_2$ and $P_2O_5:ThO_2$ ratio of 0.2.

What we claim is:
1. A process for the separation from monazite of thorium and rare earths substantially free from impurities present in monazite, comprising digesting with excess sul- phuric acid a finely-divided monazite selected from the group consisting of monazite sand and ground mineral monazite, diluting the digest with water, filtering the resulting product to remove insoluble material, treating the filtrate so obtained with material providing alkali metal and chloride ions, and removing the precipitate thus obtained containing thorium and rare earths, the concentration of sulphuric acid in the filtrate being at least 3 N and the concentration of alkali metal and chloride ions taken together being at least 50 gms./liter.

2. A process according to claim 1, in which the material providing the chloride ions is hydrochloric acid.

3. A process according to claim 1, in which the material providing alkali metal and chloride ions is an alkali metal chloride.

4. A process according to claim 3, in which the alkali metal chloride is one selected from the group consisting of sodium chloride and potassium chloride.

5. A process according to claim 4, in which the concentration of acid in the filtrate is from 4.5 N to 5.5 N.

6. A process according to claim 4, in which the concentration of the alkali metal chloride in the filtrate is greater than 200 gms./liter.

7. A process according to claim 6, in which the concentration of alkali metal chloride in the filtrate is 200-400 gms./liter.

8. A process for the separation from monazite of thorium and rare earths substantially free from impurities, comprising digesting with excess sulphuric acid a finely-divided monazite seleceted from the group consisting of monazite sand and ground mineral monazite, diluting the digest with water, filtering the resulting product to remove insoluble material, treating the filtrate so obtained with sodium chloride in a concentration of 200-400 gms./liter of filtrate, the concentration of acid in the filtrate being from 4.5 N to 5.5 N, and removing the precipitate thus obtained containing thorium and rare earths.

9. A process according to claim 8, in which the filtrate is treated with sodium chloride at a temperature of at least about 60° C.

References Cited in the file of this patent

UNITED STATES PATENTS

| | | |
|---|---|---|
| 1,100,743 | Keetman et al. | June 23, 1914 |
| 2,425,573 | Soddy | Aug. 12, 1947 |

OTHER REFERENCES

Pilkington et al.: Rare Earths and Thorium Compounds from Monazite J. Soc. Chem. Ind. (London), 66; 387–94, 1947 (Copy in Sci. Lib.).

Mellor: Comprehensive Treatise on Inorganic and Theoretical Chemistry, vol. 7, pp. 178–181 (1927), Longmans, Green & Co., London. Copy in Div. 59.

Audsley et al.: Extraction and Refining of the Rarer Metals, pp. 351–360, March 22 and 23, 1956, Stephen Austin & Sons, Ltd., Great Britain. Copy in Div. 46.